No. 691,530. Patented Jan. 21, 1902.
J. M. BURR.
GLASS FLOAT.
(Application filed Sept. 24, 1901.)
(No Model.) 2 Sheets—Sheet 1.
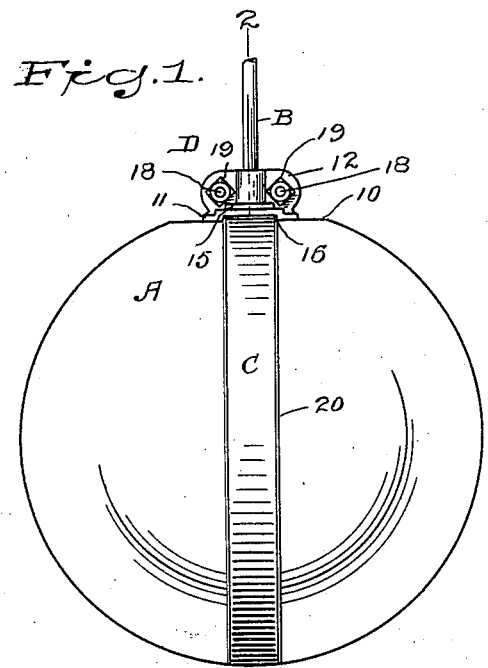
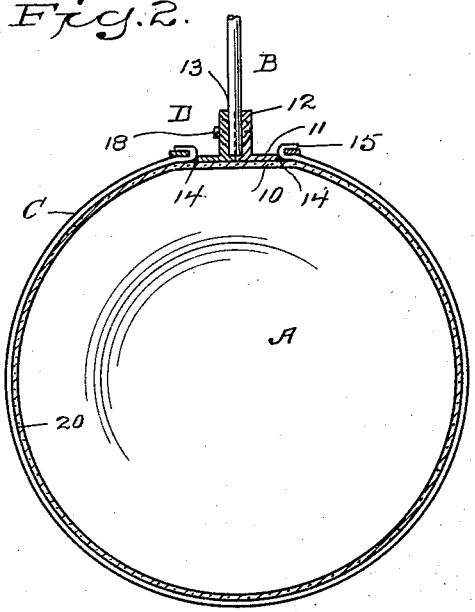
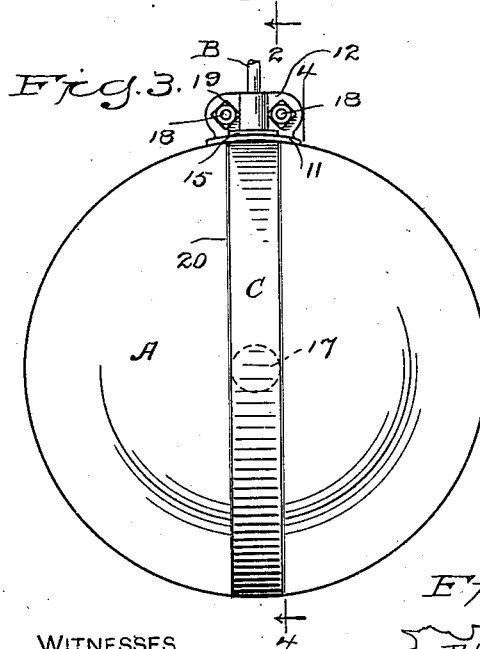
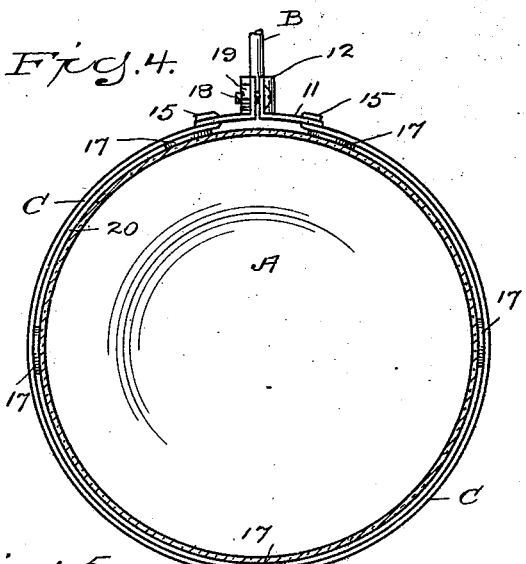
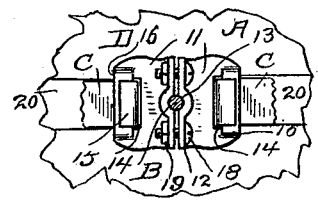
WITNESSES. INVENTOR.
John M Burr No. 691,530. Patented Jan. 21, 1902.
J. M. BURR.
GLASS FLOAT.
(Application filed Sept. 24, 1901.)
(No Model.) 2 Sheets—Sheet 2.
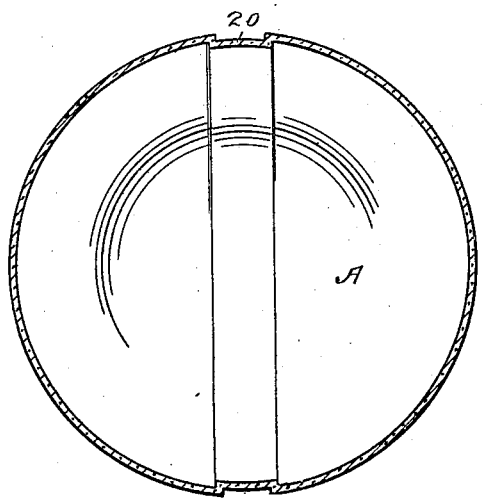
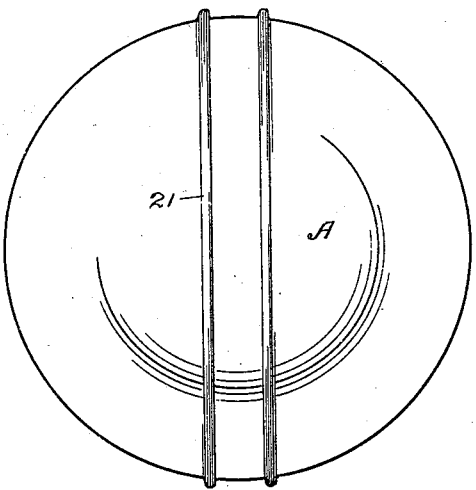
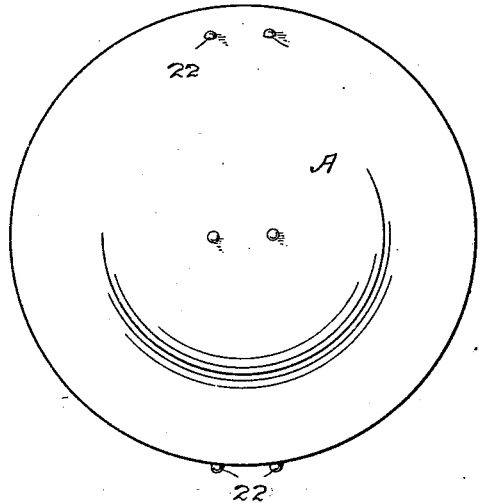
WITNESSES. INVENTOR.
H. A. Lamb John M. Burr
S. H. Atherton By A. M. Wooster
Atty.
THE NORRIS PETERS CO., PHOTO-LITHO., WASHINGTON, D. C.

UNITED STATES PATENT OFFICE.

JOHN M. BURR, OF NORWALK, CONNECTICUT.

GLASS FLOAT.

SPECIFICATION forming part of Letters Patent No. 691,530, dated January 21, 1902.

Application filed September 24, 1901. Serial No. 76,434. (No model.)

*To all whom it may concern:*

Be it known that I, JOHN M. BURR, a citizen of the United States, residing at Norwalk, county of Fairfield, State of Connecticut, have invented a new and useful Glass Float, of which the following is a specification.

My invention has for its object to produce a glass float for use in tanks—as, for example, in water-closet tanks—which without increasing the cost of production to the slightest extent shall be especially adapted for use in connection with a strap and clamp of the simplest possible construction.

It has heretofore been a serious objection to the use of glass floats by plumbers in water-closet and other tanks that the cost of the fittings was so great as to practically prohibit the use of glass floats in ordinary work. It is of course well understood by those familiar with the art that as a material for this class of floats glass has certain inherent properties which render it greatly superior to all other materials, although glass has been used for this purpose to a limited extent only, owing, as stated above, to the cost of the fittings. The fact that the fittings used in connection with metal floats have been so very much cheaper to make has caused the almost exclusive use of metal floats.

My present invention enables me to provide a glass float, and consequently to secure all the inherent advantages of glass floats, at such a greatly-reduced cost as to actually effect a saving in the cost of float and fittings over those in ordinary use.

With the above ends in view I have devised the simple and novel glass float and the corresponding fittings, of which the following description, in connection with the accompanying drawings, is a specification, reference characters being used to designate the several parts.

Figure 1 is an elevation of one form of my novel float and corresponding fittings, the float being provided with a flattened side; Fig. 2, a section on the line 2 2 in Fig. 1; Fig. 3, a view similar to Fig. 1, except that the float is made perfectly round and the fittings to correspond therewith and washers are placed in the groove under the strap; Fig. 4, a section on the line 4 4 in Fig. 3; Fig. 5, a detail plan view illustrating the mode in which the strap is drawn about the float by the clamp; Fig. 6, a section of a float with the fittings removed, showing the float as provided with a retaining device consisting of a groove or depression to receive the strap; Fig. 7, an elevation illustrating a form of float provided with parallel ridges or ribs to retain the strap in place, and Fig. 8 is a similar view illustrating a form of float provided with parallel rows of lugs or projections to retain the strap in place.

A denotes the float, which is made globular, or approximately so, and which may or may not be provided with a flattened side, as at 10.

B denotes the lever by which the float is carried, C a strap encircling the float, and D a two-part clamp, by which the strap may be drawn tightly about the float and the strap and float rigidly connected to the lever. The two parts of the clamp each consist of a base 11 and an upright 12. The two uprights are provided with half-sockets, which together comprise a socket 13 to receive the end of lever B. The bases are provided near their edges with slots 14, and the ends of the strap are turned backward upon themselves, forming hooks 15, which are adapted to engage the slots. In practice, especially when used in connection with a flat-sided float, the outer edges of the bases of the clamp are raised, so as to form sockets 16, which receive the strap, as will be clearly understood from Fig. 1. It will be noted that where the float is made with a flattened side the groove in the float, presently to be described, runs out in the flat side and the ends of the strap are received in the grooves in the under side of the bases of the clamp.

It is an essential feature of my invention that the float be so construed that when the strap is drawn about it by the clamp there will be no possibility of the float slipping out of the loop in the strap. In order to accomplish this result with absolute certainty whether or not the float is provided with a flattened side, I provide it with a retaining device for the strap. This retaining device may be a circumferential groove or depression 20, adapted to receive the strap, as in Figs.

1, 2, 3, 4, and 6, or a pair of parallel ribs or ridges 21, as in Fig. 7, which may or may not be continuous, as shown, and which receive the strap between them, or a row of parallel lugs or projections 22, between which the strap is received, as in Fig. 8. These retaining ribs or lugs are only required to be made just sufficiently prominent so that the strap cannot by any possibility slip off from the float. The form illustrated in Figs. 1, 2, 3, 4, and 6 is found eminently satisfactory in use, for the reason that the strap is sunk, as it were, into the float, the strap lying in the groove or depression and its outer surface being practically flush with the surface of the float. It should be understood, however, that the use of the groove, while neat and satisfactory, is by no means essential to the operativeness of the invention. In Figs. 3 and 4 I have shown washers 17 as placed under the strap. These washers may or may not be used, as preferred. Their object is by placing compressible material between the strap and the float to provide for expansion and contraction of the metal of the strap when the fixture is likely to be subjected to great extremes of temperature.

The members which comprise clamp D may be drawn together to cause the strap to grip the float firmly and also to rigidly secure the strap and float to the lever in any ordinary or preferred manner. I have shown the uprights of the clamp as drawn together by means of bolts 18 and nuts 19; but any other mode of accomplishing the desired result may be substituted, if preferred.

It will be observed that the strap C is flat and relatively wide and bears uniformly upon the float throughout its length and width, and the clamp D so grasps the said strap as to hold it, and consequently the float also, against vibrations or such movements relatively to the lever B as to tend to loosen the float.

Having thus described my invention, I claim—

1. The combination with a globular glass float having a retaining device, of a relatively wide flat strap held against slipping by said retaining device, a lever, and a clamp attached to said lever and connecting the ends of the strap.

2. The combination with a globular glass float having a flattened side 10 and a circumferential groove extending from one edge of the flattened portion around the float to the other edge of said flattened portion, of a flat inclosing strap in said groove, and a clamp resting against and extending across said flattened portion and connecting the ends of the strap.

3. The combination with a globular glass float having a retaining device and a lever, of an inclosing strap having hooked ends and adapted to be held against slipping by the retaining device and a two-part clamp comprising members provided with slots for engagement by the hooks and means for drawing the members toward each other to lock the strap to the float and the float to the lever.

4. The combination with a globular glass float having a retaining device and a flattened side, and a lever by which the float is carried, of an inclosing strap having hooked ends and adapted to be held against slipping by the retaining device and a two-part clamp comprising members provided with sockets in their under sides to receive the strap, slots for engagement by the hooks and bolts whereby the members are drawn toward each other to lock the strap to the float and the float to the lever.

In testimony whereof I affix my signature in presence of two witnesses.

JOHN M. BURR.

Witnesses:
FRANK X. MEIER,
WM. H. HERRING.